UNITED STATES PATENT OFFICE.

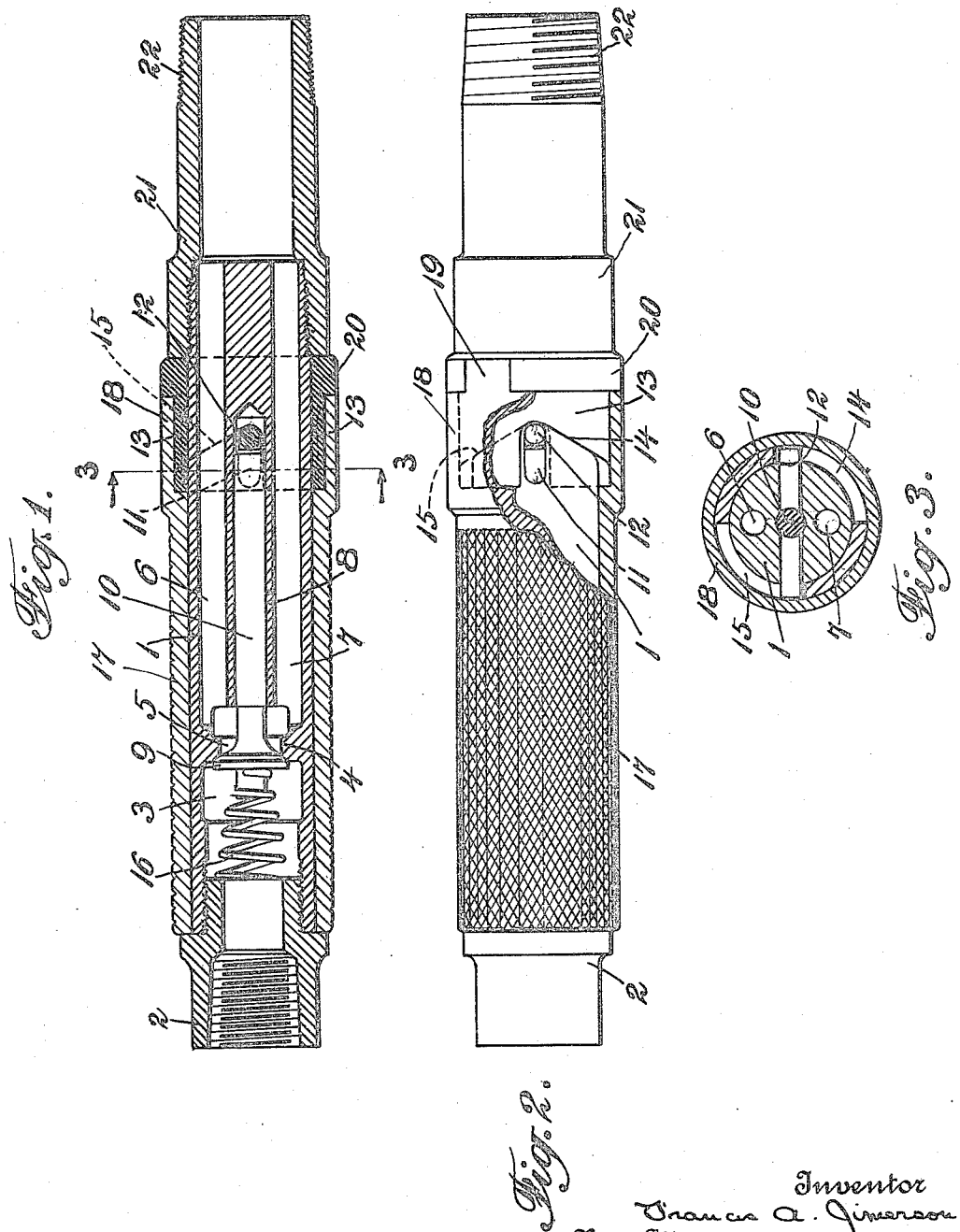

FRANCIS A. JIMERSON, OF ATHENS, PENNSYLVANIA, ASSIGNOR TO INGERSOLL-RAND COMPANY, OF JERSEY CITY, NEW JERSEY, A CORPORATION OF NEW JERSEY.

THROTTLE-VALVE FOR PNEUMATIC TOOLS.

1,229,276.  Specification of Letters Patent.  Patented June 12, 1917.

Application filed November 18, 1915. Serial No. 62,100.

*To all whom it may concern:*

Be it known that I, FRANCIS A. JIMERSON, a citizen of the United States, residing at Athens, in the county of Bradford and State of Pennsylvania, have invented a certain new and useful Improvement in Throttle-Valves for Pneumatic Tools, of which the following is a specification.

This invention relates to throttle valves for pneumatic tools, and has for its objects the provision of a simple and easily manufactured throttle of this type which will be free from the leakage usually encountered in such throttles.

A specific embodiment of the invention is shown in the accompanying drawing, in which Figure 1 shows a longitudinal section through the throttle, Fig. 2 a side elevation, partly broken away, and Fig. 3 a transverse section on the line 3—3 of Fig. 1.

The throttle, as shown, comprises an inner cylindrical member 1 into one end of which the fluid is led by an inlet connection 2 threaded into the end of the member 1. The fluid passes first into an inlet chamber 3, the inner end of which is a valve seat flange 4 through which is bored the valve aperture 5. From the inner side of the valve seat flange 4 the fluid passes into the ports 6 and 7, one passing to each side of the center of the member 1, thus leaving a central web 8 through this portion of the member 1. The valve aperture 5 is controlled by a valve 9 which opens against the direction of the fluid flow and is provided with an elongated operating stem 10, which slides in and is guided by a bore which extends longitudinally of the member 1 in the central portion of the web 8. This bore in the web 8 is open to the fluid passage only at the end which is adjacent to the valve. At the inner end of the bore, however, the web 8 is pierced diametrically by a longitudinally extending slot 11 which passes through the inner member 1 from side to side, but has no connection with the fluid passage except through the bore in the web 8. Passing through the slot 11 and in contact with the inner end of the valve stem 10 is a valve operating pin 12 the ends of which project from the surface of the inner member 1 on each side. To move this pin, and consequently the valve 9, longitudinally of the inner member 1, a cam sleeve 13 is provided which is rotatably mounted on the inner member 1 and has slanting cam surfaces 14 and 15 contacting with the projecting ends of the pin 12. To move the valve in the other direction, a spring 16 is provided which presses against the head of the valve 9 and is held in place by the inlet connection 2. To turn the cam sleeve 13 an operating sleeve 17 is provided which is rotatably mounted on the inner member 1 and has a portion 18 of larger diameter which slides over the cam sleeve 13 holding the pin 12 in position. The inner end of the larger portion 18 of the sleeve 17 is provided with lugs 19 fitting in corresponding slots in a flange 20 on the cam sleeve 13, locking the sleeves 13 and 17 so that they will move together. These parts are all held in place by a discharge connection 21 which is threaded over the inner end of the inner member 1, this discharge connection being provided with a threaded portion 22 which is threaded into the inlet socket of the pneumatic tool for which the throttle is to be used.

With the present construction leakage which is usually encountered in valves of this type due to the necessity of providing an opening into the fluid passage for the insertion of operating means for the valve is practically eliminated by reason of the provision of the central web 8 and the elongated operating stem of the valve sliding therein, and it is to be understood that while the present showing and description discloses only one specified modification of the invention, other forms and modifications are included within the spirit and scope of the same, as expressed in the appended claims.

What I claim is:

1. In a throttle for pneumatic tools, a cylindrical member having fluid passages therethrough, a valve seat therein, a spring operated valve seating on said valve seat and opening against the fluid flow, said valve having an elongated operating stem, a central web between said fluid passages, a bore in said web forming a guide for said valve stem and a slot extending through said web from the inner end of and at right angles to said bore to the outside of said member, a pin in said slot engaging said valve stem and means to move said pin and valve stem to open said valve.

2. In a throttle for pneumatic tools, a cylindrical member having fluid passages therethrough, a valve seat therein, a spring operated valve seating on said valve seat and opening against the fluid flow, said valve having an elongated operating stem, a central web between said fluid passages, a bore in said web forming a guide for said valve stem, a slot extending through said web from the inner end of and at right angles to said bore to the outside of said member, a pin in said slot engaging said valve stem and means to move said pin and valve stem to open said valve comprising a cam rotatably mounted on the outside of said member.

3. In a throttle for pneumatic tools, an inner cylindrical member having fluid passages therethrough, a spring operated valve therein having an elongated stem, a web between said fluid passages, a bore in said web forming a guide for said valve stem, a diametrical slot extending through said web from the inner end of said bore, a pin in said slot projecting from both sides of said inner cylindrical member, a double cam sleeve rotatably mounted on said inner member and arranged to move said pin to open said valve, an operating sleeve sliding over said cam and pin and holding said pin in position and means to hold said operating sleeve and cam together and prevent relative movement.

In testimony whereof, I have hereunto set my hand.

FRANCIS A. JIMERSON.